United States Patent
Argyris et al.

(10) Patent No.: US 11,750,297 B2
(45) Date of Patent: Sep. 5, 2023

(54) VOLTAGE CONTROLLED ELECTRO-OPTICAL SERIALIZER/DESERIALIZER (SERDES)

(71) Applicant: MELLANOX TECHNOLOGIES, LTD., Yokneam (IL)

(72) Inventors: Nikos Argyris, Zografou (GR); Yoav Rozenberg, Haifa (IL); Dimitrios Kalavrouziotis, Papagou (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/764,540

(22) PCT Filed: Nov. 14, 2019

(86) PCT No.: PCT/GR2019/000080
§ 371 (c)(1),
(2) Date: Mar. 29, 2022

(87) PCT Pub. No.: WO2021/094790
PCT Pub. Date: May 20, 2021

(65) Prior Publication Data
US 2022/0337321 A1    Oct. 20, 2022

(51) Int. Cl.
*H04B 10/50* (2013.01)
*H04B 10/2575* (2013.01)
*H04B 10/564* (2013.01)

(52) U.S. Cl.
CPC . *H04B 10/50572* (2013.01); *H04B 10/25759* (2013.01); *H04B 10/564* (2013.01)

(58) Field of Classification Search
None
See application file for complete search history.

(56) References Cited

U.S. PATENT DOCUMENTS

| | | |
|---|---|---|
| 6,341,031 B1 | 1/2002 | McBrien et al. |
| 8,346,087 B2 | 1/2013 | O'Krafka et al. |
| 8,676,060 B2 | 3/2014 | Kawanishi et al. |

(Continued)

FOREIGN PATENT DOCUMENTS

WO    2020229849 A1    11/2020

OTHER PUBLICATIONS

Shubin et al., "Microring-based Multi-chip WDM Photonic Module," Optics Express, vol. 23, issue 10, pp. pp. 1-14, May 18, 2015.

(Continued)

*Primary Examiner* — Darren E Wolf
(74) *Attorney, Agent, or Firm* — KLIGLER & ASSOCIATES PATENT ATTORNEYS LTD

(57) ABSTRACT

An optoelectronic transmitter (10) includes an electro-optic modulator (12), digital driving circuitry (14), and feedback circuitry (30). The electro-optic modulator is configured to modulate an optical signal in response to an electrical drive signal. The digital driving circuitry is coupled to the electro-optical modulator and is configured to generate the electrical drive signal. The feedback circuitry is configured to measure a quantity indicative of a power level of the modulated optical signal produced by the electro-optic modulator, and to adapt a supply voltage to the digital driving circuitry in response to the measured quantity.

16 Claims, 3 Drawing Sheets

(56) References Cited

U.S. PATENT DOCUMENTS

| | | | |
|---|---|---|---|
| 9,225,422 B1 | 12/2015 | Nagarajan | |
| 9,467,231 B2 | 10/2016 | Bhoja et al. | |
| 9,553,673 B1 | 1/2017 | Nagarajan et al. | |
| 9,838,239 B2 | 12/2017 | Chen et al. | |
| 9,964,719 B1 | 5/2018 | Razdan et al. | |
| 2003/0007210 A1* | 1/2003 | Kenny | H04J 14/0252 348/E7.07 |
| 2004/0004268 A1* | 1/2004 | Brown | H01L 23/5252 257/E23.149 |
| 2007/0212076 A1 | 9/2007 | Roberts et al. | |
| 2009/0041473 A1 | 2/2009 | Nishihara et al. | |
| 2009/0278244 A1* | 11/2009 | Dunne | H01L 24/33 257/676 |
| 2010/0129072 A1* | 5/2010 | Yoshiuchi | H04B 10/6911 398/17 |
| 2012/0216084 A1 | 8/2012 | Chun et al. | |
| 2013/0084065 A1* | 4/2013 | Ishii | H04B 10/505 398/38 |
| 2013/0101296 A1* | 4/2013 | Nishimoto | H04B 10/588 398/186 |
| 2014/0153075 A1 | 6/2014 | Malacarne et al. | |
| 2015/0331262 A1* | 11/2015 | Noguchi | G02F 1/011 385/3 |
| 2017/0199328 A1 | 7/2017 | Shubin et al. | |
| 2018/0196196 A1 | 7/2018 | Byrd et al. | |
| 2018/0306991 A1 | 10/2018 | Epitaux et al. | |
| 2019/0229810 A1 | 7/2019 | Hayashi et al. | |
| 2019/0324298 A1 | 10/2019 | Dayel et al. | |

OTHER PUBLICATIONS

Krishnamoorthy et al., "From Chip to Cloud: Optical Interconnects in Engineered Systems," Journal of Lightwave Technology, vol. 35, issue 15, pp. 1-14, year 2017.

Atabaki et al., "Integrating Photonics with Silicon Nanoelectronics for the Next Generation of Systems on a Chip," Nature, vol. 556, p. 1-33, Apr. 18, 2018.

Akhter et al., "WaveLight: A Monolithic Low Latency Silicon-Photonics Communication Platform for the Next-Generation Disaggregated Cloud Data Centers," 2017 IEEE 25th Annual symposium on High-Performance Interconnects (HOT), pp. 25-28, year 2017.

OZ Optics, "Directional Fiber Optic Power Monitors (Taps/Photodiodes)", Product Information, Ottawa, Canada, pp. 1-5, Feb. 23, 2018.

Wolf et al., "Coherent Modulation up to 100 GBd 16QAM Using Silicon-Organic Hybrid (SOH)", Optics Express, vol. 26, No. 1, pp. 220-232, Jan. 8, 2018.

Audzevich et al., "Power Optimized Transceivers for Future Switched Networks," IEEE Transactions on Very Large Scale Integration (VLSI) Systems, vol. 22, No. 10, pp. 2081-2092, Oct. 1, 2014.

International Application # PCT/GR2019/000034 Search Report dated Feb. 12, 2020.

International Application # PCT/GR2019/000080 Search Report dated Aug. 3, 2020.

* cited by examiner

VOLTAGE CONTROLLED ELECTRO-OPTICAL SERIALIZER/DESERIALIZER (SERDES)

CROSS-REFERENCE TO RELATED APPLICATIONS

This application is U.S. national-phase of PCT application PCT/GR2019/000080, filed Nov. 14, 2019, whose disclosure is incorporated herein by reference.

FIELD OF THE INVENTION

The present invention relates generally to optical communications, and particularly to apparatuses for transmitting and receiving optical communication signals at high data rates and control methods thereof

BACKGROUND OF THE INVENTION

Closed-loop control of power consumption of communication transceivers operating at high data rates has been previously proposed in the patent literature. For example, U.S. Pat. No. 9,467,231 describes various embodiments that provide a communication interface configured to transfer data at high bandwidth using PAM format(s) over optical communication networks. A feedback mechanism is provided for adjusting the transmission power levels. In an embodiment, a data communication system includes a network interface device comprising a first optical communication interface configured to receive an optical signal that is transmitted over an optical communication link, the optical signal transmission being characterized by a signal level and a noise level, wherein the optical signal is received from a transmitter device. The system further includes a photodiode configured to convert the optical signal to an electrical signal, a TIA configured to amplify the electrical signal transmission, an analog to digital converter for converting electrical amplified electrical signal to digital signals, and a processor configured to calculate a set of threshold levels based on at least the signal level and the noise level, and generate a set of power transmission levels for the transmitter device, where the power transmission levels being based on non-equispaced threshold levels. The system includes an encoder for encoding the power transmission levels, and a second optical communication interface for sending the encoded power transmission levels to the transmitter device. The system additionally includes a PAM modulation driver for driving the encoded power transmission levels, and a laser for driving output signals. The transmitter device adjusts transmission power levels for sending data to the network interface based on the encoded power transmission power level. The noise level includes a signal independent component, a component proportional to the signal power, and a component proportional to the square of the signal power.

As another example, U.S. Patent Application Publication 2012/0216084 describes a system that involves a first serializer/deserializer (Serdes) link from a first integrated circuit (IC) to a second IC and a second link from the second IC to the first IC. Power consumption settings in circuitry of the first link are adjusted to control power consumption such that the bit error rate of the first link is maintained in a range, where the lower bound of the range is substantially greater than Zero. Power consumption settings in circuitry for the second link are adjusted to control power consumption such that the bit error rate of the second link is maintained in range, where the lower bound of the range is substantially greater than Zero. In one example, circuitry in the second IC detects errors in the first link and reports back via the second link. The first IC uses the reported information to determine a bit error rate for the first link.

SUMMARY OF THE INVENTION

An embodiment of the present invention provides an optoelectronic transmitter including an electro-optic modulator, digital driving circuitry, and feedback circuitry. The electro-optic modulator is configured to modulate an optical signal in response to an electrical drive signal. The digital driving circuitry is coupled to the electro-optical modulator and is configured to generate the electrical drive signal. The feedback circuitry is configured to measure a quantity indicative of a power level of the modulated optical signal produced by the electro-optic modulator, and to adapt a supply voltage to the digital driving circuitry in response to the measured quantity.

In some embodiments, the feedback circuitry is configured to set the supply voltage to the digital driving circuitry in an inverse relation to the measured quantity.

In some embodiments, the digital driving circuitry includes a serializer-deserializer (SerDes).

In an embodiment, the feedback circuitry includes a power detector that is configured to receive a portion of the modulated optical signal from the optical modulator, and to measure the quantity by measuring a photocurrent proportional to the square root of the optical power level of the portion.

There is additionally provided, in accordance with an embodiment of the present invention, an optoelectronic transmitter manufacturing method, the method including fabricating an electro-optic modulator, for modulating an optical signal in response to an electrical drive signal. Digital driving circuitry for generating the electrical drive signal is fabricated. Feedback circuitry is fabricated and connected between the electro-optic modulator and the driving circuitry, for measuring a quantity indicative of a power level of the modulated optical signal produced by the electro-optic modulator, and for adapting a supply voltage to the digital driving circuitry in response to the measured quantity.

In some embodiments, fabricating the electro-optical modulator includes implementing the electro-optical modulator in back end of line (BEOL) layers of a semiconductor chip, wherein fabricating the digital driving circuitry includes implementing a serializer-deserializer (SerDes) in front end of line (FEOL) layers of the semiconductor chip, and including coupling the SerDes to the electro-optical modulator by vias in the semiconductor chip.

In some embodiments, fabricating the feedback circuitry includes implementing an optical power detector coupled to an analog-to-digital converter (ADC).

In an embodiment, fabricating the optical power detector includes implementing the optical power detector in front end of line (FEOL) layers of a semiconductor chip and coupling the optical power detector to an output of the electro-optical modulator using a through-BEOL optical connection.

In another embodiment, fabricating the feedback circuitry includes implementing the ADC in front end of line (FEOL) layers of a semiconductor chip, and implementing the optical power detector outside the semiconductor chip.

In yet another embodiment, fabricating the feedback circuitry includes implementing the ADC and the optical power detector outside a semiconductor chip on which the electro-optic modulator is fabricated.

There is further provided, in accordance with an embodiment of the present invention, a control method of an optoelectronic transmitter, the method including generating an electrical drive signal using digital driving circuitry. An optical signal is modulated using the electrical drive signal. A quantity is measured, which is indicative of a power level of the modulated optical signal. A supply voltage to the digital driving circuitry is adapted in response to the measured quantity.

The present invention will be more fully understood from the following detailed description of the embodiments thereof, taken together with the drawings in which:

DETAILED DESCRIPTION OF EMBODIMENTS

Overview

Figure 1:
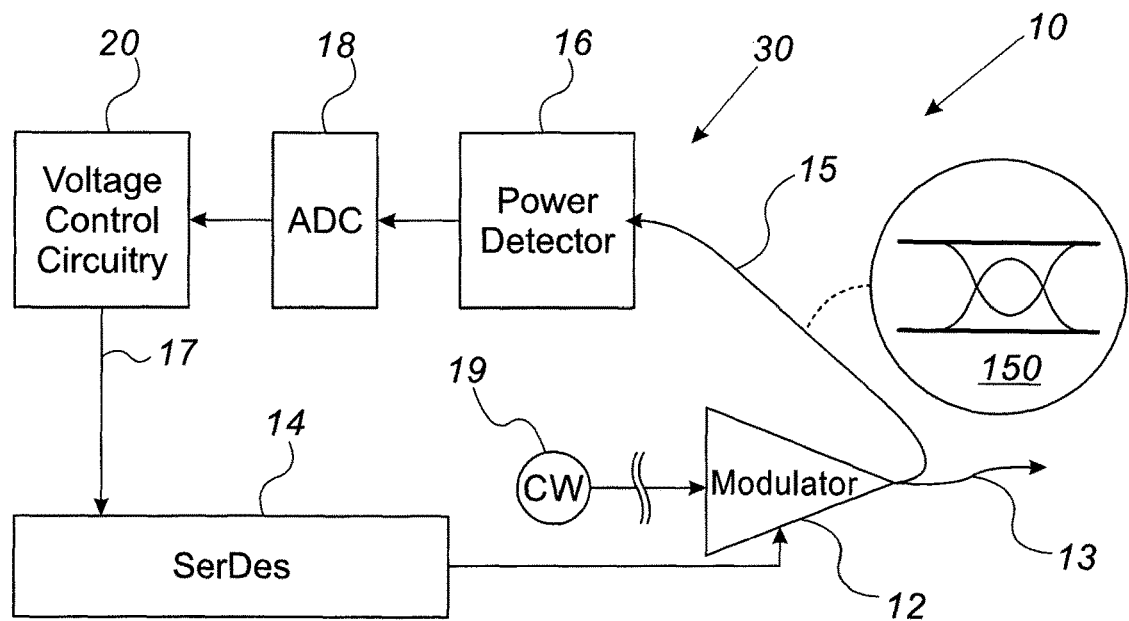
FIG. 1 is a schematic block diagram of an optoelectronic transmitter comprising a feedback circuitry configured to adjust a driving voltage amplitude of an electro-optical modulator of the transmitter, in accordance with an embodiment of the present invention.

An optical data center network typically utilizes multiple optoelectronic transmitters and receivers for communicating between nodes of the data center network using high Gb/sec modulated optical signals transmitted over fiber links. In a typical design process, an allowable minimal signal to noise ratio (SNR) of the optical communication signals is determined and margins are taken to ensure that the communication signals are of sufficient quality, taking into account manufacturing tolerances and worst-case scenarios in the field.

For a given fiber link, the SNR of a modulated optical signal can be changed, for example, by adjusting the inputted optical power, by adjusting the electrical (e.g., voltage) amplitude of the modulating signal and/or by adjusting the output optical power via an attenuator at the output of the modulator. A common method to characterize the SNR is to estimate it from an "Eye Diagram" of the waveform of the outputted modulated optical signal at the receiver. Specifically, the integrity of the generated optical waveform can be maintained under increased optical attenuation conditions by modulating the optical signal with a higher voltage amplitude (up to a certain limit above which the increased driving voltage will not affect the shape of the eye diagram and thus the SNR estimation). However, inspecting the quality of an Eye Diagram during field operation is costly and often impractical.

Therefore, margins in optical power and in modulating voltage amplitude have to be included in order to ensure that the communication between nodes remains intact even under uncommon worst-case conditions in the field, such as unusually high optical loss of the system. For example, a manufacturer may provide five times the nominally rated optical power to mitigate worst-case optical losses in the field. However, usually such losses vary, depending on field conditions, and in many cases actual loss is near nominal. Nevertheless, the strong optical signals are modulated using excessive voltage amplitude as if the optical power was nominal. In such a case, the resulting optical SNR is far above requirements, while the electro-optical chips are driven with electrical power that is far higher than is actually required.

Embodiments of the present invention that are described hereinafter provide techniques to optimize the amplitude of driving voltage. The disclosed techniques account for variations of RMS optical power output in the field, as well as variations in manufacturing, to provide transmitter designs that can handle the aforementioned worst-case scenarios while at as same time minimize electrical power consumption at nominal conditions, without the need for sophisticated equipment (e.g., such as required for Eye Diagram estimation).

In some embodiments, an optoelectronic transmitter is provided that includes an electro-optic modulator, driving circuitry, and feedback circuitry. The driving circuitry is coupled to the electro-optical modulator and provides driving signals with adjustable amplitude to drive the electro-optic modulator to output a modulated optical signal. The feedback circuitry is calibrated to correlate the SNR of the modulated optical signal to a measured quantity indicative of a power level of the modulated optical signal for a range of driving signal amplitudes. For example, the measured quantity may comprise an RMS-optical power of the modulated optical signal. The feedback circuitry is coupled to an optical output of the electro-optic modulator to measure the quantity (e.g., RMS output power of the modulated optical signal), and, using this calibration, it is coupled to the driving circuitry to adjust the amplitude of the driving signals provided by the driving circuitry according to the measured RMS output power to maintain a prespecified SNR of the modulated optical signal. In an embodiment, the feedback circuitry is configured to set the supply voltage to the digital driving circuitry in an inverse relation to the measured quantity.

In some embodiments, the feedback circuitry includes a photodiode detector coupled at the output of the optical modulator. Using the photocurrent readings from the photodiode output, the feedback circuitry adjusts the amplitude of the driving signals according to the RMS photocurrent outputted by the photodiode so as to maintain a prespecified optical SNR of the modulated output signal. The RMS photocurrent output of the photodiode is square proportional to the RMS to the RMS output optical power of the portion of the modulated signal tapped and monitored. Specifically, the voltage amplitude of the driving signal is reduced when the measured RMS photocurrent (and thus the optical output) is sufficiently high. Using the RMS-measured photocurrent power in such a way (e.g., instead of inspecting an Eye Diagram) is made possible by taking into account an SNR budget that is factory-calibrated over a linear part of the optical modulation characteristics against the RMS photocurrent of the monitor photodiode.

The aforementioned optoelectronic transmitter is typically implemented as a system on a semiconductor chip. The transmitter includes driving circuitry, such as comprising a SerDes (Serializer/Deserializer) component to, for example, drive an electro-optical modulator on the chip to output the modulated optical signal. Typically, using the SerDes, the transmitter multiplexes external serial data from system-level input sources such as Serial-ATA, InfiniBand, Gigabit Ethernet, and others, into serial fiber-channel data streams.

Less often, but still possible, direct laser modulation (e.g., DMLs, VCSELs) can be used, in which a laser driver is employed to condition the driving signals to be fed into the laser. In such case, the SerDes feeds the laser driver module. In principle this approach would require another mapping on how the SerDes output voltage affects the laser driver output. Then, the optical output power could be determined and linearly depend on the SerDes voltage for a certain regime.

In high Gb/sec applications, the SerDes often uses much of the chip's power budget. The electrical power modulation dissipation by the SerDes is proportional to the square of the voltage amplitude ($\sim V^2$) supplied to the SerDes. Therefore, minimizing the required voltage rating in the field (while maintaining an acceptable SNR of the optical signal) minimizes power dissipation, that in turn may save the need for costly multi-chip solutions. As another example, consistent over-estimation of SerDes power needs may result in higher cooling costs.

An accurate management of a SerDes power budget is therefore essential to achieve an optimal level of integration. By using the disclosed real-time RMS-power wise control of optical communication signal integrity, the disclosed technique may enable wider adoption of optical data center networks.

Voltage Controlled Electro-Optical Serdes

FIG. 1 is a schematic block diagram of an optoelectronic transmitter 10 comprising a feedback circuitry 30 configured to adjust a driving voltage amplitude of an electro-optical modulator 12 of transmitter 10, in accordance with an embodiment of the present invention. The driving voltage (i.e., modulating signal) is supplied to a SerDes 14 that is coupled to modulator 12 to drive modulator 12.

In the shown embodiment, electro-optical modulator 12 is a Mach-Zehnder interferometric modulator. Modulator 12 is configured to modulate a continuous wave (CW) input optical signal from a CW laser source 19. The modulated optical signal is outputted from modulator 12 via fiber-link 13.

As seen, an optical power detector 16 of feedback circuitry 30 is coupled to an output of modulator 12 via a link 15 to measure RMS output power of the output optical signal (using the photocurrent on the output of the power detector), where the measured RMS power is indicative of the power of the outputted optical signal in fiber-link 13.

The photocurrent of the power detector is converted into a digital signal using an analog to digital converter (ADC) 18 of feedback circuitry 30. A voltage control circuitry 20 receives the digital signal and adjusts a voltage level supplied to SerDes 14 according to a predetermined relation, such as provided below by Eq. 1.

In an embodiment, a calibration procedure is provided in which the RMS output power is measured in-factory and correlated with an Eye Diagram 150 to generate a calibration (e.g., a look-up table) that provides a relation between an actual RMS-measured optical output power of modulator 12 and the required voltage amplitude provided by SerDes 14. In the field, a given level of SNR (correlated to the measured RMS optical power) can be maintained by the disclosed technique by applying the following relation between actual RMS optical power and the required voltage amplitude supplied to SerDes 14:

$$V_{SerDes}(P)=\alpha \cdot P_0-\beta \cdot (P-P_0), \qquad \text{Eq. 1}$$

where $V_{SerDes}$ is a voltage rating supplied to the SerDes (e.g., a peak to peak voltage amplitude), $\alpha$ and $\beta$ are factory calibrated positive coefficients, $P_0$ is a nominal RMS optical power, and P is the actual RMS optical power in the field.

Using Eq. 1, when the actual optical power in the field is measured to be higher than a value determined in-factory as required to achieve a given SNR, i.e., $P-P_0>0$, indicating actual SNR in the field is above requirement, voltage control circuitry 20 lowers the required voltage amplitude, $V_{SerDes}$(P), from a nominal value $V_{SerDes}(P_0)=\alpha \cdot P_0$ to the value provided by Eq. 1.

If, on the other hand, the actual optical power in the field is measured to be lower than that determined in-factory as required to achieve the given SNR, indicating that actual SNR in the field is below requirement, voltage control circuitry 20 increases the voltage rating to SerDes 14 according to Eq. 1 to improve waveform quality.

The block diagram shown in FIG. 1 is chosen purely for the sake of conceptual clarity. Elements that are not mandatory for understanding of the disclosed techniques, such as electrical amplification stages, are omitted from the figure for simplicity of presentation.

Figure 2:
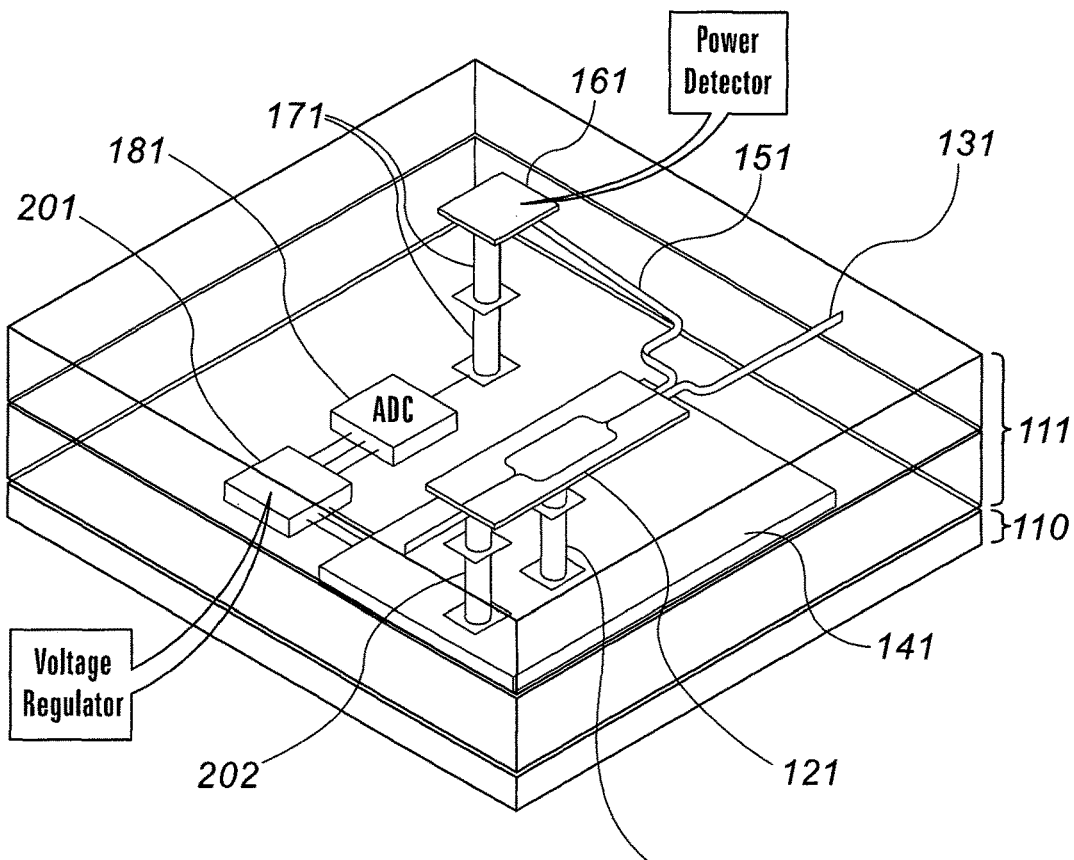
FIG. 2 is a schematic, pictorial isometric view of an implementation of the transmitter of FIG. 1, in accordance with an embodiment of the present invention.

FIG. 2 is a schematic, pictorial isometric view of an implementation of transmitter 10 of FIG. 1, in accordance with an embodiment of the present invention. In the shown embodiment, a SerDes 141 along with an ADC 181 and a voltage regulator 201 (i.e., control voltage circuitry 201) are developed in a front end of line (FEOL) layers 110 of an on-chip system. These chips are interconnected with low speed electrical transmission lines. An electro-optic modulator 121 (e.g., a Mach-Zehnder Modulator 121) and an optical power detector 161 are developed in a back end of line (BEOL) layers 111. The optical signal, typically from a CW laser source (shown in FIG. 1), is coupled to the modulator through an optical waveguide in BEOL. The driving signals generated by SerDes 141 are fed to modulator 121 using high speed electrical vias 202 through the metallization layers. The optical output of the modulator is split into two paths using an optical coupler. One of the paths of the coupler is connected to a fiber-link 131, and is outputted to the network, and the other path of the coupler carries a signal tapped to indicate the RMS power in link 131. The tapped signal is fed to an optical guide 151 and is measured by power detector 161 in BEOL.

The resulting electrical output signal of detector 161 is fed through low-speed electrical vias 171 to the FEOL and to ADC 181. Voltage regulator 201 receives the control digital signal outputted by ADC 181 and adjusts the voltage level supplied to SerDes 141 according to the relation in Eq. 1.

Figure 3:
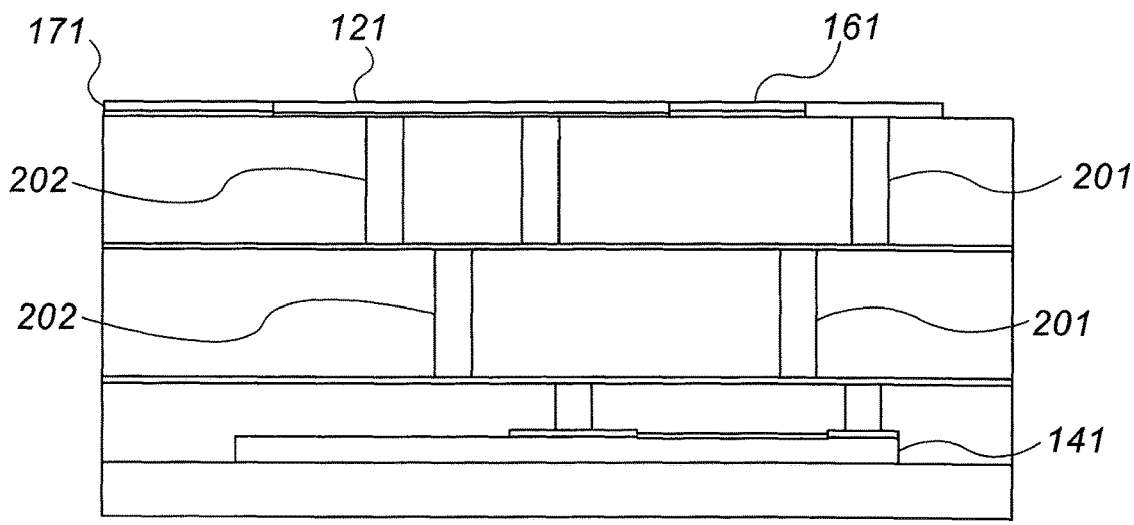
FIG. 3 is a schematic sectional view showing elements of the transmitter of FIG. 2, in accordance with an embodiment of the present invention.

FIG. 3 is a schematic sectional view showing elements of the transmitter of FIG. 2, in accordance with an embodiment of the present invention. As seen, the transmitter is implemented using processing in multiple FEOL and BEOL layers, for example, to create vias and links using lithography. An actual process flow to fabricate the system on chip shown in FIGS. 2 and 3, and in subsequent figures, contains tens of semiconductor technology steps that for simplicity of presentation are not detailed.

Figure 4:
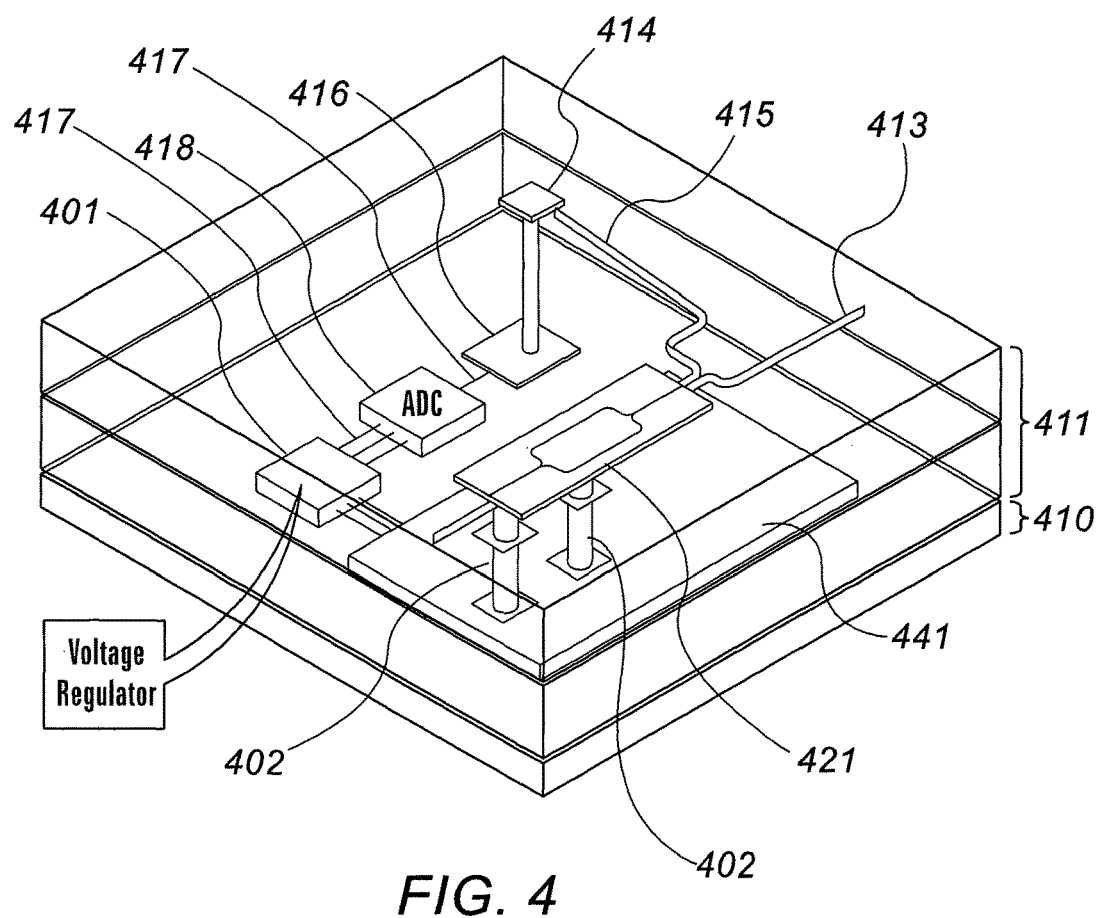
FIG. 4 is a schematic, pictorial isometric view of an implementation of the transmitter of FIG. 1, in accordance with another embodiment of the present invention.

FIG. 4 is a schematic, pictorial isometric view of an implementation of the transmitter of FIG. 1, in accordance with another embodiment of the present invention. In the embodiment shown by FIG. 4, an optical power detector 416 resides in FEOL layers 410.

The driving signals generated by a SerDes 441 are fed to a modulator 421 using high speed electrical vias 402 through the metallization layers. The optical output of the modulator is split into two paths with an optical coupler. The optical output of the modulator is split into two paths using an optical coupler. One of the paths of the coupler is connected to a fiber link 413, and is outputted to the network, and the other output path (415) of the coupler carries a signal tapped to indicate the RMS power in link 413. The tapped signal in optical guide 415 is fed to an optical transition 414, which directs the optical signal to power detector 416 using a through-BEOL optical connection 417.

The electrical signal outputted by power detector 416 is fed directly to an ADC 418 through low speed electrical lines in FEOL layers 410. Voltage regulator 401 receives the control digital signal outputted by ADC 418 and adjusts the voltage level supplied to SerDes 441 according to the relation in Eq. 1.

Figure 5:
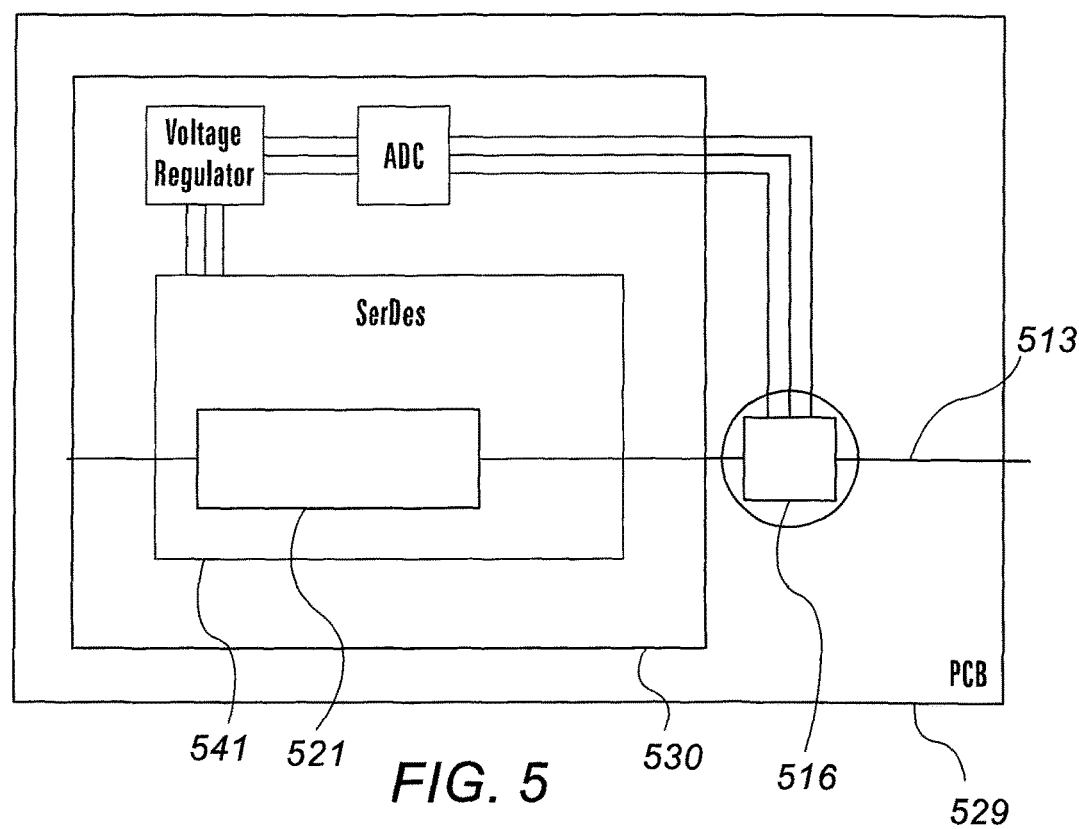
FIG. 5 is a schematic block diagram of an implementation of the transmitter of FIG. 1, in accordance with yet another embodiment of the present invention.

FIG. 5 is a schematic block diagram pictorial isometric view of an implementation of the transmitter of FIG. 1, in accordance with yet another embodiment of the present invention. In the shown embodiment, a power detector is placed outside a chip 530. The modulator output is coupled to an optical fiber 513 at the edge of the chip. The power detector that monitors the output power is a commercially available inline optical tap monitor 516, such as produced by OZ Optics (Ottawa, Canada). The monitored signal is interfaced to the chip (and the ADC) from the electrical pins of the tap through low speed electrical tracks on a PCB 529.

Figure 6:
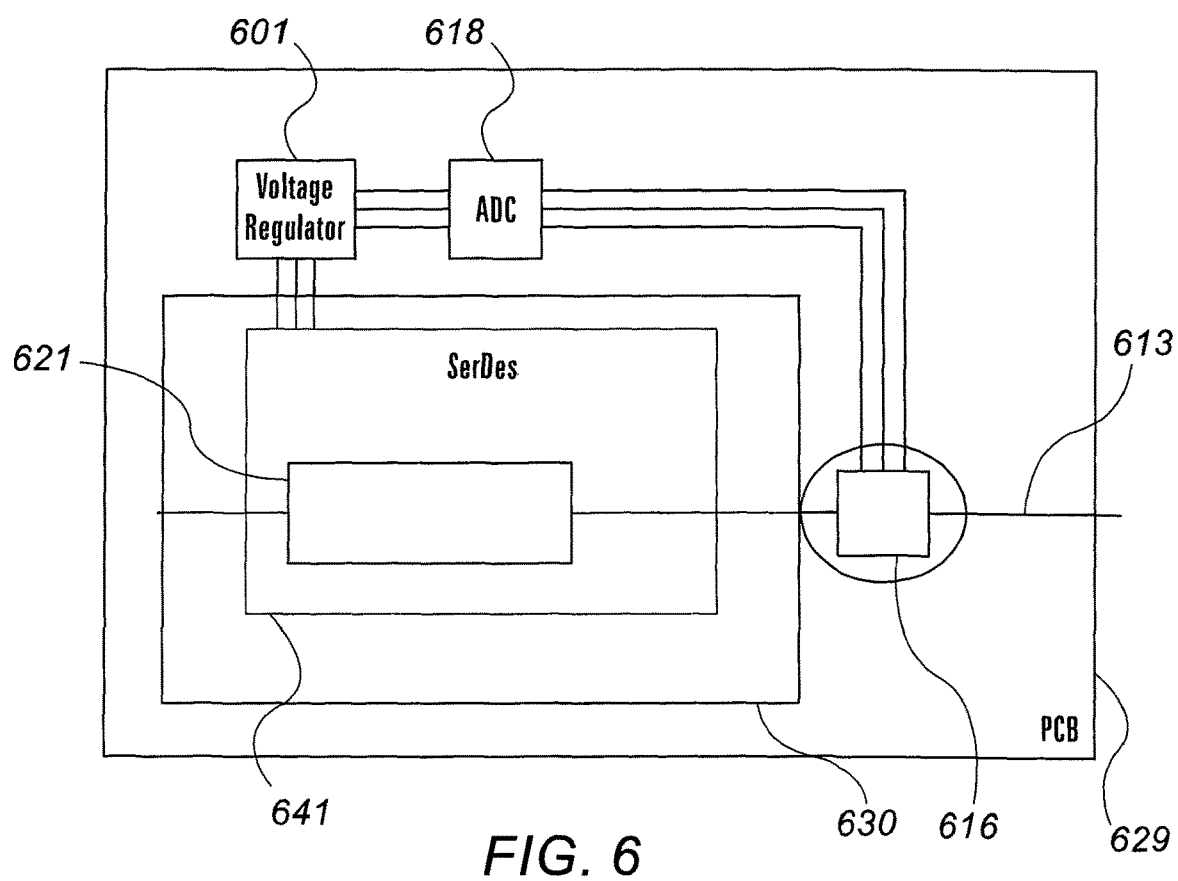
FIG. 6 is a schematic block diagram of an implementation of the transmitter of FIG. 1, in accordance with a further embodiment of the present invention.

FIG. 6 is a schematic block diagram pictorial isometric view of an implementation of the transmitter of FIG. 1, in accordance with a further embodiment of the present invention. In the embodiment shown by FIG. 6, an inline optical tap monitor 616, such as tap monitor 516 of FIG. 5, is used to measure the optical power of the modulated signal in a fiber-link 613 that is outputted to the network. The monitored signal is interfaced to an off-chip 630 ADC 618 through low speed electrical lanes on a PCB 629. ADC 618 and voltage regulator 601 are implemented outside chip 630, on PCB 629, and voltage regulator-SerDes supply lines are implemented as low-speed PCB tracks.

Although the embodiments described herein mainly address control of transmission of high data rates in optical communication systems, the methods and systems described herein can also be used in other applications, such as in with different optical transceiver topologies, including systems with front panel transceivers, on mid-board cards or on-board optics and on Multi-chip Modules.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An optoelectronic transmitter, comprising:
an electro-optic modulator, which is configured to modulate an optical signal in response to an electrical drive signal;
digital driving circuitry, which is coupled to the electro-optical modulator and is configured to generate the electrical drive signal; and
feedback circuitry, configured to measure a quantity indicative of a power level of the modulated optical signal produced by the electro-optic modulator, and to adapt a supply voltage to the digital driving circuitry in response to the measured quantity, the feedback circuitry comprising a power detector that is configured to receive a portion of the modulated optical signal from the optical modulator, and to measure the quantity by measuring a photocurrent proportional to the square root of the optical power level of the portion.

2. The transmitter according to claim 1, wherein the feedback circuitry is configured to set the supply voltage to the digital driving circuitry in an inverse relation to the measured quantity.

3. The transmitter according to claim 1, wherein the digital driving circuitry comprises a serializer-deserializer (SerDes).

4. The transmitter according to claim 1, wherein the electro-optic modulator is fabricated in back end of line (BEOL) layers of a semiconductor chip, and wherein the feedback circuitry is fabricated in front end of line (FEOL) layers of the semiconductor chip.

5. The transmitter according to claim 4, wherein the semiconductor chip comprises vias to connect the feedback circuitry between the electro-optic modulator and the driving circuitry.

6. The transmitter according to claim 1, wherein the feedback circuitry comprises an analog-to-digital converter (ADC) coupled to the power detector.

7. The transmitter according to claim 6, wherein the ADC is implemented in front end of line (FEOL) layers of a semiconductor chip, and wherein the power detector is implemented outside the semiconductor chip.

8. The transmitter according to claim 6, wherein the ADC and the power detector are implemented outside a semiconductor chip on which the electro-optic modulator is fabricated.

9. The transmitter according to claim 1, wherein the power detector is implemented in front end of line (FEOL) layers of a semiconductor chip, and wherein the power detector is coupled to an output of the electro-optical modulator using a through-BEOL optical connection.

10. An optoelectronic transmitter manufacturing method, the method comprising:
fabricating an electro-optic modulator in back end of line (BEOL) layers of a semiconductor chip, for modulating an optical signal in response to an electrical drive signal;
fabricating digital driving circuitry, for generating the electrical drive signal;
fabricating feedback circuitry, including a serializer-deserializer (SerDes), in front end of line (FEOL) layers of the semiconductor chip; and connecting the feedback circuitry between the electro-optic modulator and the driving circuitry, including coupling the SerDes to the electro-optical modulator by vias in the semiconductor chip, for measuring a quantity indicative of a power level of the modulated optical signal produced by the electro-optic modulator, and for adapting a supply voltage to the digital driving circuitry in response to the measured quantity.

11. An optoelectronic transmitter manufacturing method, the method comprising:
fabricating an electro-optic modulator, for modulating an optical signal in response to an electrical drive signal;
fabricating digital driving circuitry, for generating the electrical drive signal; and
fabricating feedback circuitry, including implementing an optical power detector coupled to an analog-to-digital converter (ADC); and
connecting the feedback circuitry between the electro-optic modulator and the driving circuitry, for measuring a quantity indicative of a power level of the modulated optical signal produced by the electro-optic modulator, and for adapting a supply voltage to the digital driving circuitry in response to the measured quantity.

12. The method according to claim 11, wherein fabricating the optical power detector comprises implementing the optical power detector in front end of line (FEOL) layers of a semiconductor chip and coupling the optical power detector to an output of the electro-optical modulator using a through-BEOL optical connection.

13. The method according to claim 11, wherein fabricating the feedback circuitry comprises implementing the ADC in front end of line (FEOL) layers of a semiconductor chip, and implementing the optical power detector outside the semiconductor chip.

14. The method according to claim 11, wherein fabricating the feedback circuitry comprises implementing the ADC and the optical power detector outside a semiconductor chip on which the electro-optic modulator is fabricated.

15. A control method of an optoelectronic transmitter, the method comprising:
generating an electrical drive signal using digital driving circuitry;
modulating an optical signal using the electrical drive signal;
measuring a quantity indicative of a power level of the modulated optical signal, by receiving a portion of the modulated optical signal and measuring photocurrent proportional to the optical power level of the portion; and
adapting a supply voltage to the digital driving circuitry in response to the measured quantity.

16. The method according to claim 15, wherein adapting the supply voltage comprises setting the supply voltage in an inverse relation to the measured quantity.

* * * * *